United States Patent [19]

Zarobila

[11] Patent Number: 4,728,191

[45] Date of Patent: Mar. 1, 1988

[54] DIVIDED INTERFEROMETER EMPLOYING A SINGLE 3×3 COUPLER/SPLITTER

[75] Inventor: Clarence J. Zarobila, Herndon, Va.

[73] Assignee: Optical Technologies, Incorporated, Herndon, Va.

[21] Appl. No.: 921,586

[22] Filed: Oct. 22, 1986

[51] Int. Cl.⁴ ............................................. G01B 9/02
[52] U.S. Cl. .................................... 356/345; 250/227
[58] Field of Search ............... 356/345, 352; 250/227; 350/96.15

[56] References Cited

U.S. PATENT DOCUMENTS 4,603,296  7/1986  Koo et al. ...................... 356/345 X

OTHER PUBLICATIONS

Sheem et al., "Optical Techniques to Solve the Signal Fading Problem in Fiber Interferometers", Feb. 15, 1982, vol. 21, No. 4, Applied Optics, pp. 689–693.

Primary Examiner—Eugene R. Laroche
Assistant Examiner—Robert J. Pascal
Attorney, Agent, or Firm—Kerkam, Stowell, Kondracki & Clarke

[57] ABSTRACT

Fiberoptic sensors are disclosed employing one, two, or more optical fibers which are connected to a single source of coherent light through a single 3×3 coupler/splitter thereby retaining a larger portion of the coherent light in the system.

4 Claims, 7 Drawing Figures

DIVIDED INTERFEROMETER EMPLOYING A SINGLE 3×3 COUPLER/SPLITTER

Related subject matter is disclosed and claimed in U.S. patent application Ser. No. 915,113 filed by Robert E. Einzig, entitled, "Fluid Flow Sensing Apparatus For In Vivo and Industrial Applications Employing Novel Optical Fiber Pressure Sensors"; and U.S. patent application Ser. No. 915,110 filed by Charles M. Davis, entitled, "Fiber Optic Temperature Sensor".

BACKGROUND OF THE INVENTION

It is known from, for example, the Davis and Einzig U.S. Patent Applications referenced herein that fiberoptic sensors employing dual fibers and single fibers provide many advantages over sensors of the non-fiberoptic types. However, in such prior art teachings, the sensors, where a divided interferometer is employed, employ at least a minimum of two 3-dB coupler/splitters, herein after designated 3 dB C/S. At each such 3-dB C/S, there is a loss of radiant energy travelling in the optical fiber.

It has now been discovered that fiberoptic sensors employing one, two, or more optical fibers can be assembled with only a single 3×3 coupler/splitter, herein after designated 3×3 C/S, thereby retaining a larger portion of the radiant energy, such as light, in the system. In the prior art, the use of the term 3-dB C/S is actually a 2×2 C/S.

BRIEF SUMMARY OF THE PRESENT INVENTION

The invention can be summarized as a fiberoptic sensor, comprising a source of coherent light, at least one fiberoptic sensor interferometer, means connecting the coherent light to at least one sensor, the connecting means including a single 3×3 C/S, a demodulator fiberoptic interferometer connected to the 3×3 C/S and a pair of optical detectors connected through the 3×3 C/S.

BRIEF DESCRIPTION OF THE DRAWINGS

The invention will be more particularly described in reference to the accompanying drawing wherein.

DETAILED DESCRIPTION OF THE INVENTION

Figure 1:
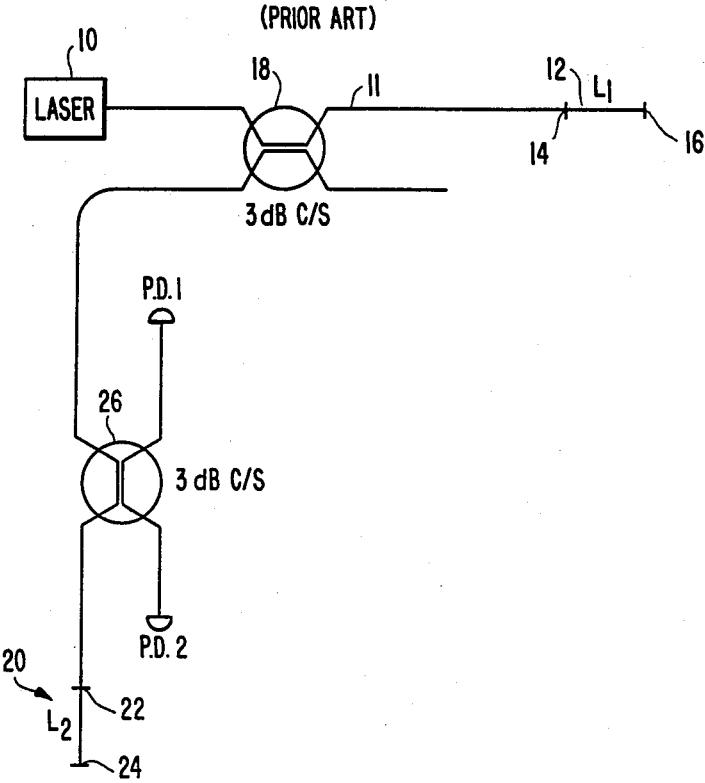
FIG. 1 illustrates a prior art fiberoptic sensor employing two 3-dB C/Ss.

As previously indicated, the prior art fiberoptic sensors employing divided interferometers are known in the art, and in general, they employ two 3-dB C/Ss. Such a prior art device is illustrated in FIG. 1. In FIG. 1, 10 is a laser connected by an optical fiber 11 to a sensor Fabry-Perot cell 12. The cell includes a partial mirror 14, and a full mirror 16. The connection to the sensor 12, is via a 3-dB C/S 18. The system also includes a second 3-dB C/S 26, a demodulator Fabry-Perot cell 20, having a partial mirror 22, and a full mirror 24. The spacing between the mirrors 14 and 16 is $L_1$ while the spacing between mirrors 22 and 24 is $L_2$.

Analysis of the above configuration shows how a phase change in $L_1$, (sensor Fabry-Perot cell) is converted to an amplitude change at the partial mirror 22 located at $L_2$ (demodulator Fabry-Perot cell) and is detected by photodiode P.D.1. Also it is known that the physical length of $L_1$ can be much greater than the coherence length of the source. It is the difference $L_1 - L_2$ that needs to be within the source's coherence length in order for interference to occur. The above configuration requires two 3-dB C/Ss.

Figure 2:
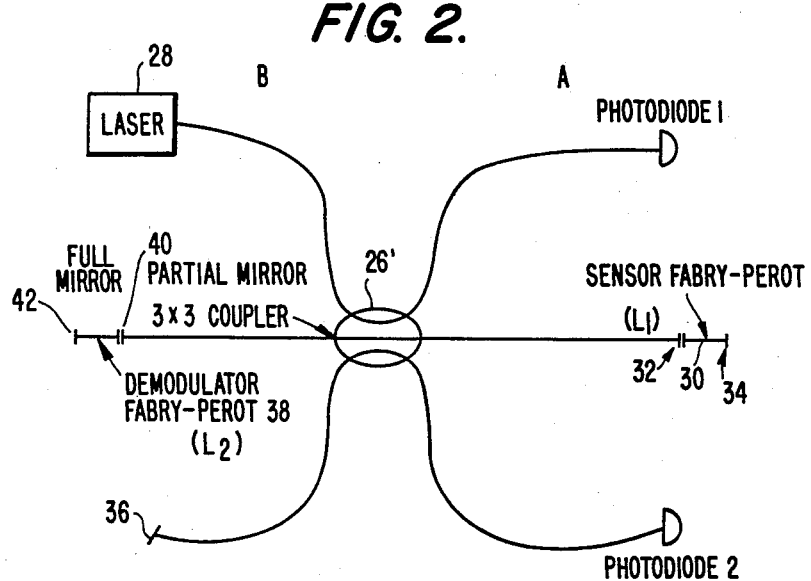
FIG. 2 illustrates a divided interferometer employing a single 3×3 C/S.

Referring now to FIG. 2, there is illustrated a sensor employing a single 3×3 C/S designated 26'. In this system, light from a multimode laser source 28 is coupled into one arm of the 3×3 C/S 26'. Upon reaching the 3×3 C/S, two-thirds of the light reaches photodiodes 1 and 2. One-third of the light reaches the sensor Fabry-Perot cell 30 and strikes the partial mirror 32 where some of this light is reflected and the rest transmitted (assuming no absorption by the partial mirror) to the full mirror 34. At the full mirror 34, light is reflected back to the partial mirror 32 where, again, some is reflected and the rest transmitted. Interference at the partial mirror in $L_1$, the sensor Fabry-Perot cell 30, does not occur since the difference in path length of the two beams ($2L_1$) is significantly greater than the coherence length of the source. However, the phase of the light in $L_1$ is changed if path length $L_1$ is changed. The light which was reflected by the partial and full mirrors travels back to the 3×3 C/S 26' where one-third of it travels back to the laser 28, one-third travels to the optical dump 36 and is lost, and one-third travels to the demodulator Fabry-Perot cell 38.

This light strikes the partial mirror 40 in the demodulator cell 38 where some of it is reflected and the rest transmitted to the full mirror 42 where it is reflected back to the partial mirror 40. Interference at the partial mirror of the demodulator cell occurs between the initial beam that reflected off the partial mirror 32 of the sensor cell 30 and traveled through the length of the demodulator cell 38 and the beam that traveled through the sensor cell 30 and reflected off the partial mirror 40 of the demodulator cell 38. Just as in the case of the divided interferometer employing two 3-dB C/Ss it is the difference in path length $L_1 - L_2$ that must lie within the coherence length of the source 28 if interference is to occur. The beams of light that do not travel through the sensor and demodulator cells follow identical paths, and hence, do not interfere. The interference occurring at the partial mirror of the demodulator cell 38, is monitored by photodiodes 1 and 2. In this manner, common-mode rejection is obtained. Since interference does not occur at the 3×3 C/S, the sensor and demodulator cells may be located in any arm on side A and B of the coupler, respectively. The demodulator cell need not be a Fabry-Perot cell; it could be configured as a Mach-Zehnder. Also, the demodulator may be configured as a Michelson cell.

Figure 3:
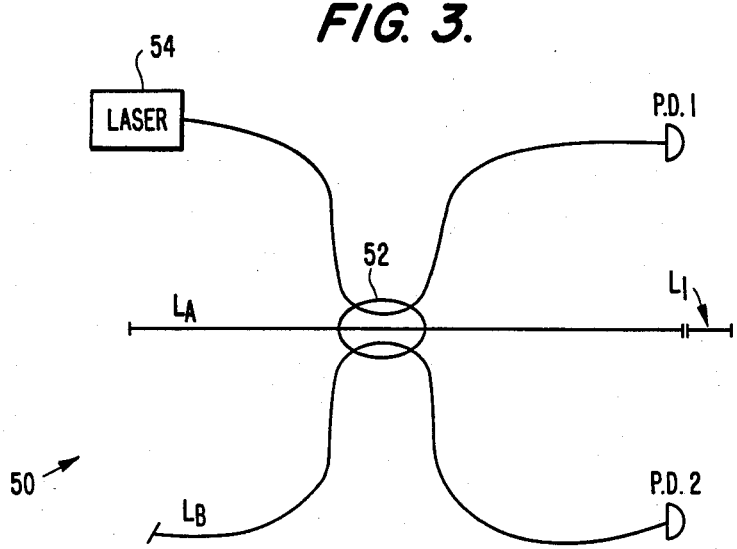
FIG. 3 illustrates a form of the invention employing a 3×3 C/S and Michelson demodulator.

Referring now to FIG. 3 showing the Michelson interferometer arrangement is illustrated at 50, the 3×3 C/S is designated 52, and the source of light at 54. The optical action occurs as before, except interference now occurs at the 3×3 C/S. The demodulator arm path length difference is $L_B-L_A$. If $L_B-L_A=L_1$ to within the coherent length of the source, interference will occur and photodiodes 1 and 2 will monitor the interference.

Figure 4:
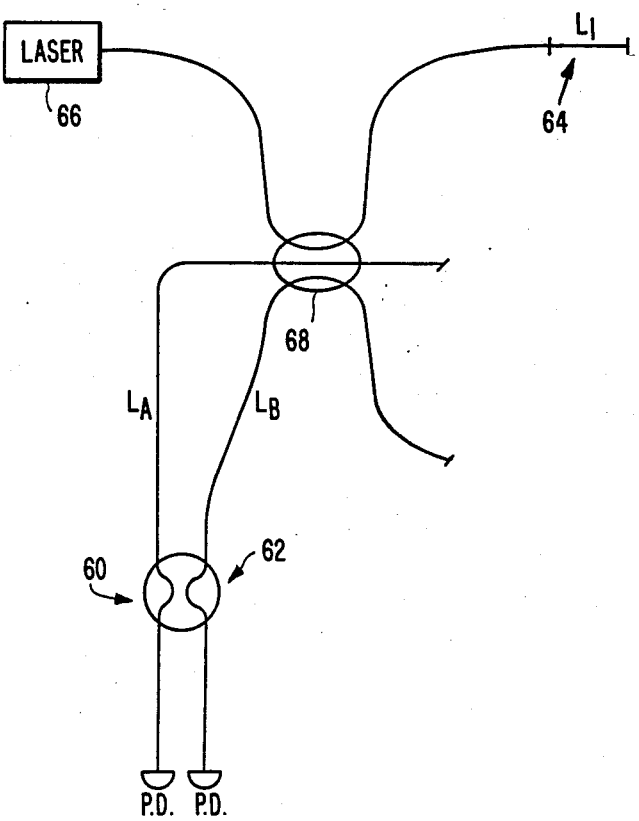
FIG. 4 illustrates a form of the invention, wherein the modulator is configured as a Mach-Zehnder cell.

FIG. 4 depicts the demodulation cell 60 configured as a Mach-Zehnder. A 2×2 C/S (3-dB C/S) 62 is added to the previous configuration. In this case however, the demodulation arm path length difference $L_B-L_A$ must equal twice the Fabry-Perot sensor 64 length (2 $L_1$) to within the coherence length of the source, if interference is to occur at the 3-dB C/S 68.

MULTI-SENSOR CAPABILITY OF THE SINGLE 3×3 C/S

Figure 6:
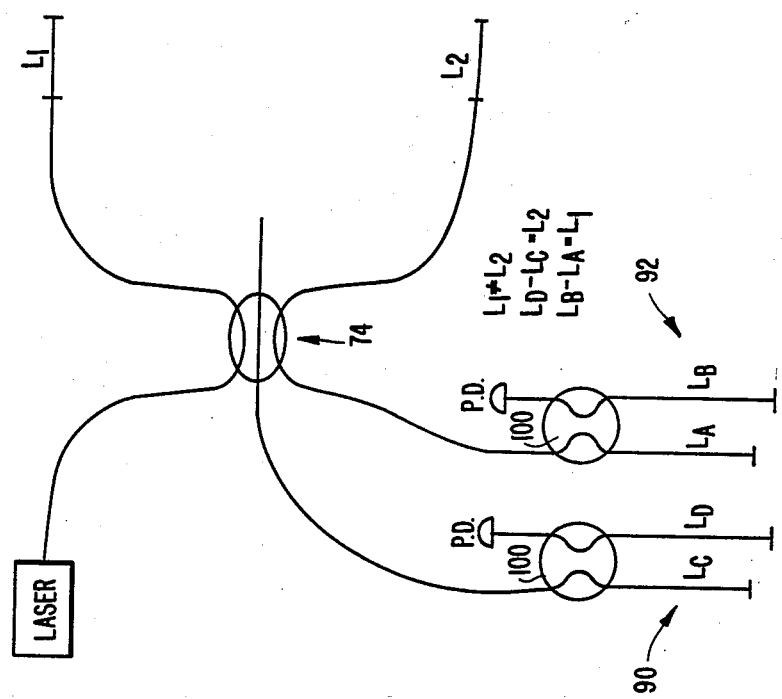
FIG. 6 is a view like FIG. 5 with Michelson demodulators.
Figure 5:
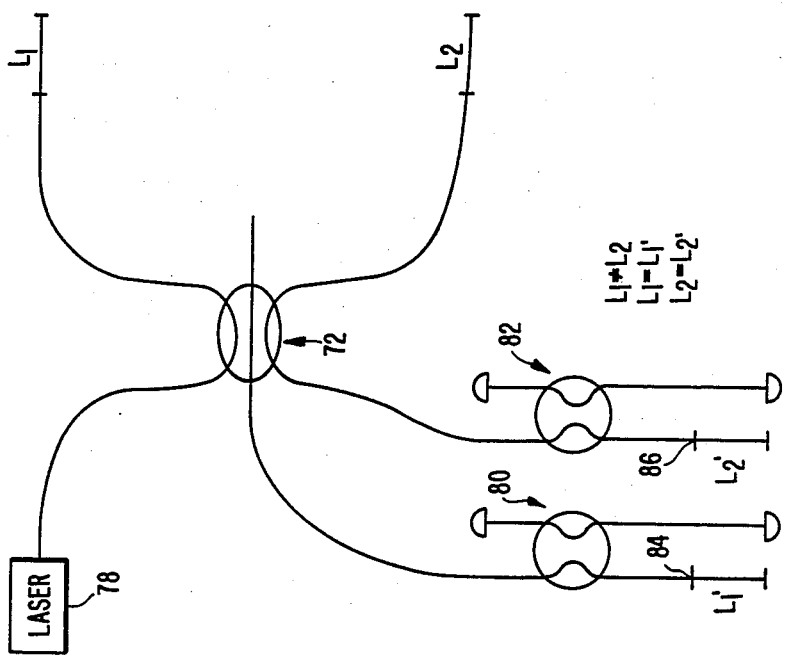
FIG. 5 illustrates a multi-sensor divided interferometer employing a 3×3 C/S and a Fabry-Perot demodulator.
Figure 7:
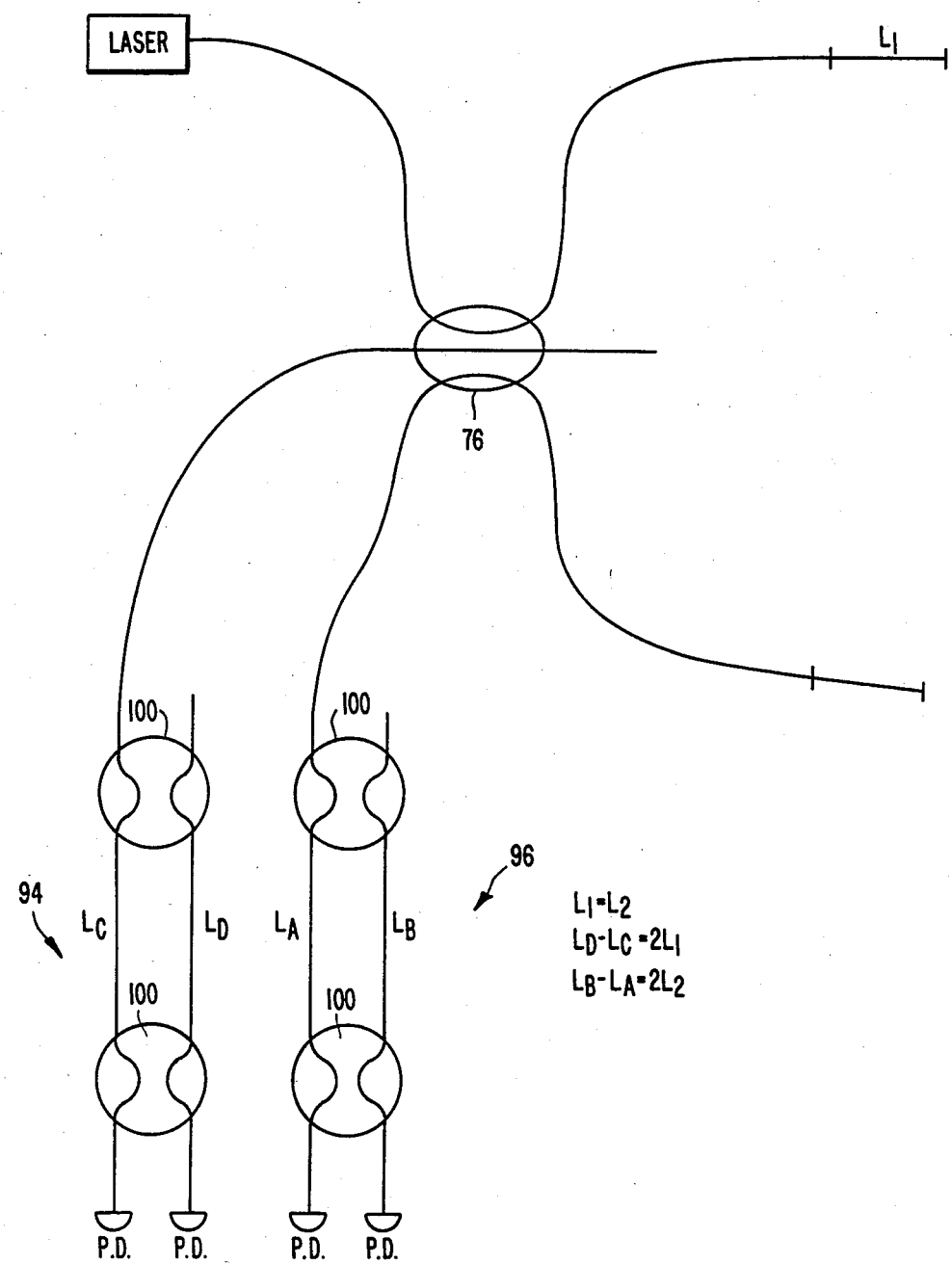
FIG. 7 is a view like FIG. 5 with Mach-Zehnder demodulators.

A single 3×3 C/S combined with other 3-dB C/Ss may be used to obtain multi-sensing capability. FIGS. 5, 6, and 7 show various interferometric arrangements that can be employed using a single 3×3 C/S 72, 74, or 76 and 2 or more 3-dB C/Ss.

FIG. 5 depicts a single 3×3 C/S 72 having two different Fabry-Perot sensing lengths $L_2$ and $L_1$ such that length $L_2$ is greater than $L_1$ by more than the coherence length of the source 78. Thus, interference does not occur at the 3×3 C/S 72 between beams propagating within $L_2$ and $L_1$. However, these beams travel to the Fabry-Perot demodulation interferometers where they propagate through lengths $L_2'$ and $L_1'$. Thus, interference occurs at the partial mirrors 84 and 86 in the demodulation interferometer due to the respective path length differences between $L_1$ and $L_1'$ as well as $L_2$ and $L_2'$. Interference at the partial mirror in $L_1'$ results from the beam propagating through sensor length $L_1$ only. Interference at the partial mirror 82 in $L_2'$ results from the beam propagating through sensor length $L_2$ only. There is no cross-talk between the sensor lengths $L_1$ and $L_2$ as long as $L_2$ is greater than $L_1$ by more than the coherence length of the source.

FIGS. 6 and 7 show remote demodulators 90, 92, 94, and 96 employing a 3-dB C/Ss 100 configured as Michelson and Mach-Zehnder interferometers, respectively. In FIG. 6, interference occurs at the 3-dB C/Ss when the path length differences $L_B-L_A$ and $L_D-L_C$ equal the sensing lengths $L_1$ and $L_2$, respectively to within the source coherence length. FIG. 7 depicts a demodulation Mach-Zehnder arrangement which requires the path length differences $L_B-L_A$ and $L_D-L_C$ to be equal to $2L_1$ and $2L_2$, respectively to within the source coherence length.

I claim:

1. A fiber optic sensor comprising a source of coherent light, at least one fiber optic sensor interferometer; means connecting the coherent light to said at least one sensor, said connecting means including a single 3×3 C/S; a demodulator fiber optic interferometer, means connecting said coherent light to the demodulator interferometer, said connecting means including said 3×3 C/S, a first optical detector for said sensor interferometer connected through said 3×3 C/S, a second optical detector for the demodulator interferometer connected through said 3×3 C/S.

2. The fiber optic sensor as defined in claim 1, wherein the interferometers are Fabry-Perot.

3. The fiberoptic sensor as defined in claim 1, wherein the interferometers are Michelson.

4. The fiberoptic sensor as defined in claim 1, wherein the interferometers are configured as Mach-Zehnder cells.

* * * * *